United States Patent [19]

Mester

[11] Patent Number: 4,914,661
[45] Date of Patent: Apr. 3, 1990

[54] METHOD AND APPARATUS FOR CORRECTING ERRORS IN DIGITAL SIGNALS HAVING PHASE FLUCTUATIONS

[75] Inventor: Roland Mester, Darmstadt, Fed. Rep. of Germany

[73] Assignee: Robert Bosch GmbH, Stuttgart, Fed. Rep. of Germany

[21] Appl. No.: 198,131

[22] Filed: May 24, 1988

[30] Foreign Application Priority Data

Jun. 11, 1987 [DE] Fed. Rep. of Germany ....... 3719404

[51] Int. Cl.$^4$ .......................... G06F 11/10; G11C 29/00
[52] U.S. Cl. ........................................ 371/40.1; 360/53
[58] Field of Search ...................... 371/37, 38, 39, 40, 371/40.1, 38.1, 39.1; 360/53

[56] References Cited

U.S. PATENT DOCUMENTS

| | | | |
|---|---|---|---|
| 3,778,787 | 12/1973 | Cannon | 360/53 |
| 4,254,500 | 3/1981 | Brookhart | 371/38 |
| 4,682,332 | 7/1987 | Okamoto | 371/38 |
| 4,763,332 | 8/1988 | Glover | 371/37 |
| 4,775,978 | 10/1988 | Hartness | 371/38 |

Primary Examiner—Charles E. Atkinson
Attorney, Agent, or Firm—Frishauf, Holtz, Goodman & Woodward

[57] ABSTRACT

8-bit data words and check words of a data block are supplied to an error recognition circuit the same time that they are written into a FIFO storage unit a word clock rate derived from the signals reproduced from a magnetic tape record which are subject to phase fluctuations. At the same time a counter is advanced by the same clock pulses. The error recognition circuit forms syndrome words by which each erroneous data word can be located and its address stored, as the state of the counter, into a register which is capable of registering more than one such address. The error recognition circuit also generates an error pattern multibit signal which is likewise stored in a register which can store more than one error pattern. Clock pulses of the same frequency as the write-in pulses but without fluctuations in phase are generated for read out of data blocks from the FIFO storage unit and for producing a train of pulses for clocking a second counter, the state of which is compared with the address or addresses stored in the first register, so that at the same time an erroneous word is read out from the FIFO unit the corresponding error pattern will be combined with the erroneous data word in an XOR correlation to provide the necessary correction of the erroneous word.

10 Claims, 10 Drawing Sheets

METHOD AND APPARATUS FOR CORRECTING ERRORS IN DIGITAL SIGNALS HAVING PHASE FLUCTUATIONS

CROSS-REFERENCES TO PENDING APPLICATIONS ON RELATED SUBJECT MATTER (1) application of Jurgen Heitmann, Rolf Loos and Roland Mester, for "Method and apparatus For Producing Video Data Stored on a Magnetic Tape in a Manner facilitating Search and Slow Motion Operation", U.S. Ser. No. 07/193,903, filed May 13, 1988. (2) application of Roland Mester for "Method of Reproducing Data Recorded on Magnetic Tape with Reliable Reproduction of Data Block Identification Signals", Ser. No. 07/198,135, filed May 24, 1988. (3) application of Jurgen Heitmann for "Method and Apparatus for Concealing Errors in Reproduced Digital Signals Utilizing FIR Filter", U.S. Ser. No. 07/198,133, filed May 24, 1988, and (4) application of Roland Mester for "Intermediate Picture Field Storage System for Variable Speed Magnetic Tape Video Data Read-Out", Ser. No. 07/201,484, filed June 1, 1988.

This invention concerns correction of errors in digital signals transmitted in data word blocks including check words in predetermined positions in the blocks permitting correction by Reed-Solomon codes, when the digital signals are subject to timing irregularities referred to as phase fluctuations, such as occur in reproduction of digital signals from a magnetic tape record.

A recommendation which is sometimes known as the D1 Standard for digital recording of video signals on magnetic tape has been published by the European Broadcasting Union (EBU) in the publication Tech 3252 and by the Society of Motion Picture and Television Engineers (SMPTE) in publications 224M to 228M. As there described video information is subdivided among four channels and then recorded by the oblique track method on magnetic tape. The video signals are recorded in data blocks, sometimes referred to as sync blocks or synchronization blocks, each of which contains 134 8-bit data words. Preceding the video data of each block there are in each case two synchronizing words followed by four identification words. Thereafter follow two code blocks each of which consists of 60 data words and four check words. The check words reproduced during recording are derived from the preceding data words of the code block in accordance with a Reed-Solomon code.

In reproduction of the signals from tape, in order to recognize and correct errors, so-called "syndromes" are formed from the data and check words. Syndrome formation by the heretofore available means involves considerable expense because of the complicated syndrome formation rules of the Reed-Solomon codes as well as on account of the high bit rate in each channel (more than 50 Mbit/s). Formation of the syndromes by microprocessors is not practical because of the high required rate of computation. A hard-wired syndrome circuit with adding and multiplying circuits is very expensive. There is a further problem that recognition and correction of errors are affected by timing errors resulting from phase fluctuations of the signals reproduced from magnetic tape. Since these vary from channel to channel, a unitary and steady (quartz-stabilized) sequence of word rate clocking pulses is necessary at the stage of putting the channels together, if not earlier, and a change of timing of the digital signals may be necessary in the individual channels.

SUMMARY OF THE INVENTION

An object of the present invention is to provide a system of error recognition and correction in accordance with a Reed-Solomon code that can be performed in a relatively simple manner, including timing conversion with substantially no additional expense.

Briefly, a first data word clocking signal is derived from the reproduced digital signals, the digital signals are written into an intermediate storage unit and at the same time, at the rate of the first data word clocking signal, correction signals and related data word address or control signals are generated and stored, after which the stored signals are read out of the intermediate storage unit by means of a second data word clocking signal of the same frequency as the first clocking sigal but free of phase fluctuations. The stored correction and control signals are used to correct erroneous-data words without disturbance of the steady read-out rhythm.

The generation of correction signals and related address or control signals takes place during and after the writing in of the digital signals belonging to a data block.

The apparatus of the invention for practicing the method utilizes a first counter and a first register for the position in a data block of an erroneous word and a second counter and a second register as well as a comparator and a correction circuit all of which are clocked at the stabilized data word rate for reading out the digital signals from the first intermediate storage unit. The output of the comparator serves to time the correction of an erroneous data word.

Further details of the method and apparatus of the invention are best understood in connection with the description that follows further below.

BRIEF DESCRIPTION OF THE DRAWINGS

The invention is further described by way of illustrative example by reference to the annexed drawings, in which.

DESCRIPTION OF THE ILLUSTRATED EMBODIMENT AND METHOD

Figure 1:
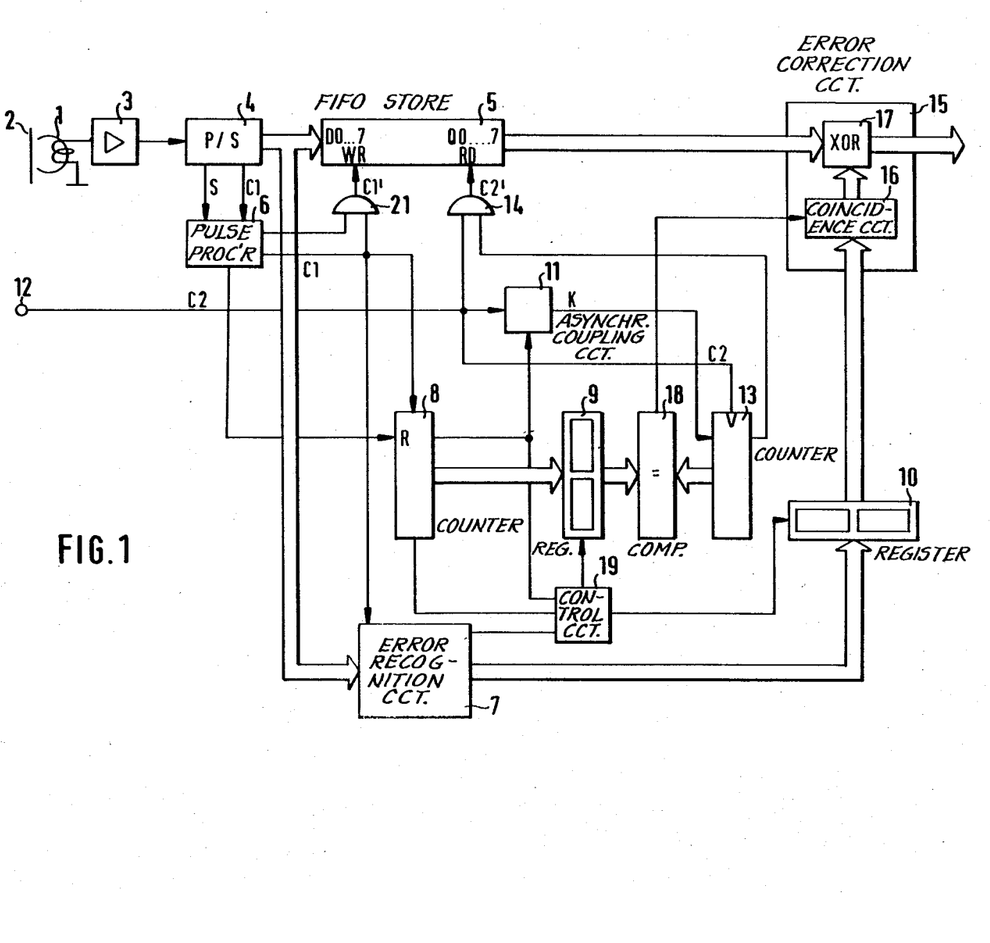
FIG. 1 is a block circuit diagram of apparatus embodying the invention.

The block circuit diagram of FIG. 1 shows a circuit that is provided in quadruplicate in a video recorder conforming to the above-mentioned D1 standard. Signals recorded on a magnetic tape 2 are read out from the tape by means of a reproducing magnetic head 1 and then amplified in an amplifier 3 which in a known way also has means for correcting the frequency characteristic to compensate for distortion. The signals thus prepared are supplied to a circuit 4 in which series to parallel conversion takes place, the synchronizing words are recognized and evaluated and the bit rate clocking of the signals is regenerated in the form of pulses C1.

Figure 2A:
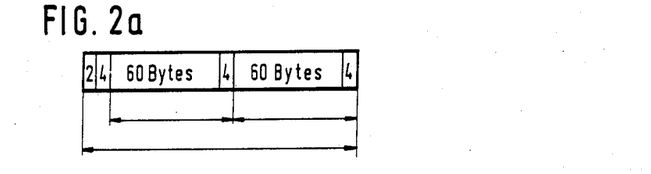
FIG. 2a is a schematic representation of a data block according to EBU Tech 3252 and FIGS. 2b, 2c, ... 2k are a series of timing diagrams drawn to the same scale as the representation of the data block of FIG. 2a showing signals occuring in various parts of the circuit of FIG. 1.

From four identification words which are recorded after the synchronizing words at the beginning of each data block, there remain only two after the series to parallel conversion because the identification words are recorded with 50% redundance. The remaining 130 words (bytes) of each data block are written into a FIFO storage unit 5, each word being written in parallel as converted by the circuit 4 and stored that way. From the bit clock pulses C1 derived from the digital signals as read out from the tape and from the synchronizing words S a word clocking signal C1' is derived by the pulse processing circuit 6 with the help of an AND gate 21 at its output, which provides a clock pulse per data block byte (word). These pulses control the writing of the digital signals into the FIFO storage unit 5. At the same time as the writing proceeds the digital signals are supplied to an error recognition circuit 7, in which each code block of the data block, is used to form a syndrome and, if there is an error present, also a correction word. Line (a) of FIG. 2 shows the two code blocks of a data block.

The error protection code which is used in accordance with the Reed-Solomon principles is a symbol-oriented code, which means that a correction word for a byte is formed in the case of error. When an erroneous data word appears, the error recognition circuit 7 provides a signal which has the effect that the content of a first counter 8 is written into a first register 9. Since this counter is started at the beginning of each data block (FIGS. 2c and 2e), the content of the counter forms an address that designates the position of each erroneous data word within the data block when the counter content is put into the register 9. The error pattern itself (a correction word) is taken into a second register 10 as an 8-bit wide data word. As will be further explained in connection with FIGS. 2a . . . 2k, the simultaneous storage of several error patterns and positions is necessary. For this reason the registers 9 and 10 are each provided as multiple registers, in the illustrated case each for two 8-bit words. A control circuit 19 is provided for controlling these registers 9 and 10. The control circuit 19 is supplied with signals from the counter 8 in addition to a signal from the error recognition circuit 7.

The highest count state of the counter 8 is reached 64 word periods after the entire block is written into the FIFO storage unit 5. Then an overflow signal of the counter 8 is used to produce a pulse in an asynchronous coupling circuit 11, this pulse being in the pattern or sequence of quartz stabilized second word clocking signals C2 supplied at a terminal 12. This pulse used in the circuit 11 upon the overflow of the counter 8 starts a second counter 13 which is further advanced by the word clocking signal C2 used for reading the digital signals out of the FIFO storage unit 5. Since, however, only as many bytes can be read out of the FIFO storage unit 5 as were written into it, the data word clocking signals C2 are supplied through an AND circuit 14 and correlated with the signal taken from the counter 13. Further details of the circuit 11 are explained further below in connection with FIG. 10.

The content of the second counter 13 designates the position within the data block of the data word read out at the time from the FIFO storage unit 5. This count state is continually compared by a comparator 18 with the content of the register 9 that designates the position of the erroneous data word. As soon as the contents of the counter 13 and the register 9 are the same, a signal is provided by the comparator 18 to a coincidence circuit 16 of the error correction circuit 15. This has the effect that the error pattern stored in the register 10 is correlated on an exclusive-OR basis with the data word read at this time out of the FIFO storage unit 5.

The nature of the error correction circuit 15 is schematically shown in FIG. 1 by the presence of a driver circuit 16 which is made conducting by the signal, the comparator 18 and an exclusive-OR circuit 17. An advantageous embodiment of the error-correction circuit 15 is illustrated in more detail in FIG. 11.

FIG. 2a shows two successive data blocks conforming to the D1 standard, with each data block having in front of it two synchronizing words S and four block identification signals ID. After them follow 60 data words (60 bytes) in a first code block which contain video or audio information and to which four check words belong which are derived from the 60 data words in accordance with a Reed-Solomon code. Then a second code block follows which likewise has 60 data words and 4 check words.

Figure 2B:
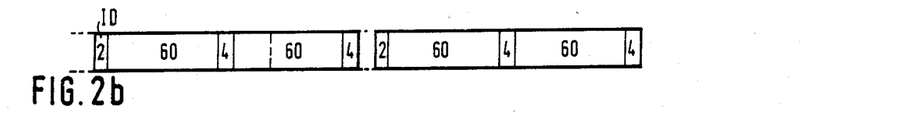

FIG. 2b shows a preliminarily processed data block having now two identification words and no synch words.

Figure 2C:
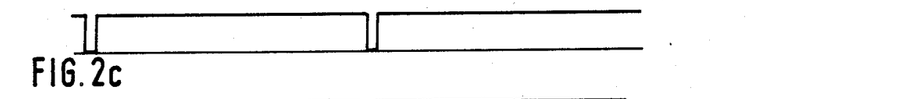

FIG. 2c shows a block start synchronizing pulse.

It is now assumed that a data word in the second code block, designated by a broken line, is erroneous.

The second data block follows the first block only after a spacing which results from the removal of the synchronizing words and the reduced number of identification words, as shown in FIGS. 2b and 2c.

Figure 2D:
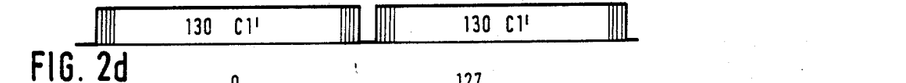

FIG. 2d shows the interrupted word clocking signal C1' which is needed to write the signals into the FIFO storage unit 5 of FIG. 1. Each block of this word clocking signals contains a 130 impulses, so that the block identification and the two code blocks belonging to a data block may be written into the FIFO storage unit. For simplification of FIG. 2, the 130 pulses are not individually represented, but are merely partially indicated.

Figure 2E:
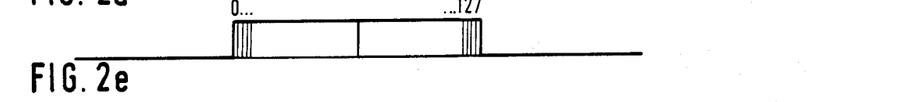

FIG. 2e shows the counting of the counter 8. The counter 8 is started when the first code block is written into the FIFO storage unit and the error recognition circuit has calculated the syndrome of the first code block.

Figure 2F:
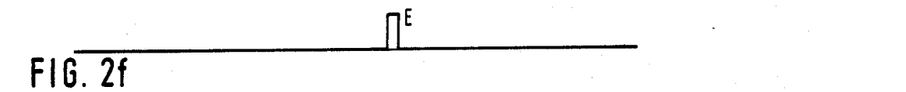
Figure 3:
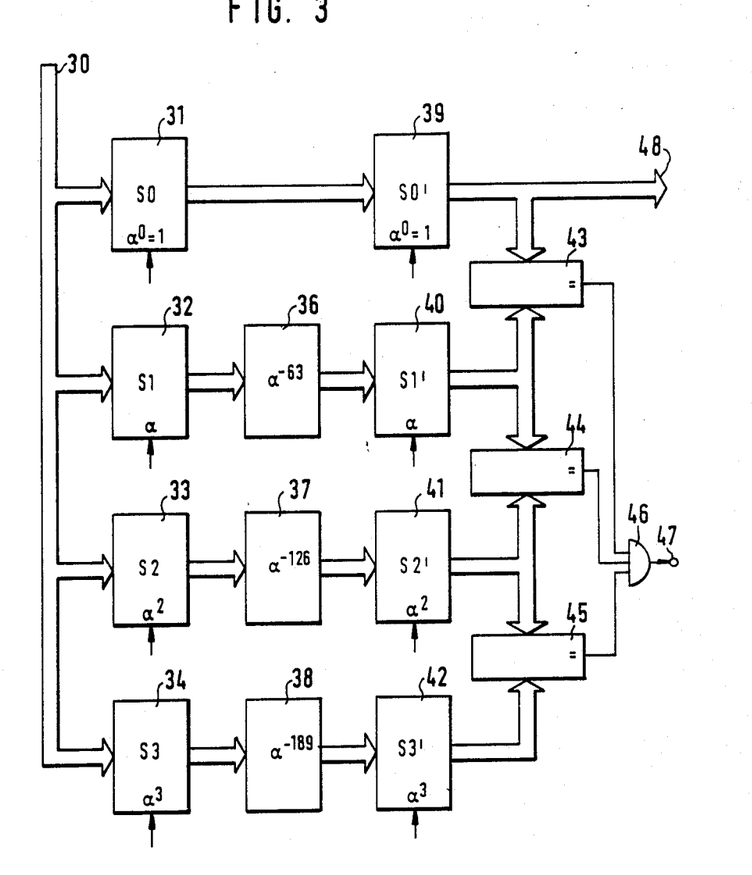
FIG. 3 is a block circuit diagram showing the error recognition circuit of FIG. 1 in greater detail.

As will be shown more exactly in connection with FIG. 3, the error recognition 7 (FIG. 1) establishes, after the reading of each code block, whether an error (or two or more errors) has occurred in this code block. Thereafter it will likewise be determined in the error recognition circuit in which data word the error has arisen. As a consequence of the error shown by a broken line in FIG. 2b, a pulse E is correspondingly provided by the error recognition circuit on account of that error, as shown in FIG. 2f. The time position of that pulse E corresponds to the time position of the erroneous data word in its code block. By the transfer of the counter state from the counter 8 into the register 9 a time position and thereby the sequential position of the erroneous data word within the code block is stored. At the same time the error pattern of the erroneous data word is supplied by the error recognition circuit 7 and written into the multiple register 10.

After a data block becomes completely written into the FIFO storage unit 5 (FIG. 1), a pulse is generated by the asynchronous coupling circuit 11 which corresponds to the first pulse of the stabilized word clock signal C2 which follows the last pulse of the clock signal C1' of a data block. For that purpose a pulse is produced by the counter 8 when it reaches a certain prescribed count content. This pulse from the counter 8 is provided to the interlock or coupling circuit 11 which produces the pulse K shown in FIG. 2g.

Figures 2G, 2H:
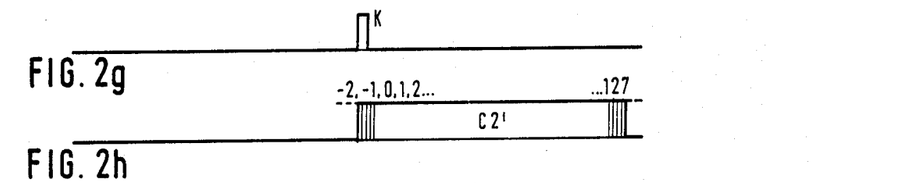

The pulse K starts a second counter 13 (FIG. 1), the count of which is advanced by the stabilized clock pulses C2. The counter 13 furnishes a signal to the AND gate 14 which signal remains there as the count content goes from $-2, -1, 0, +1 \ldots$ up to 127. The other input of the AND gate 14 receives the word clocking signals C2 and the pulse output of the AND gate 14 goes to the RD (read) control input of the storage unit 5 and is designated C2'. These pulses are shown in FIG. 2h which also shows the count state of the counter 13 at the beginning and the end of a sequence of pulses C2'.

Figure 2I:
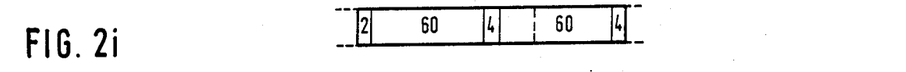
Figure 2K:
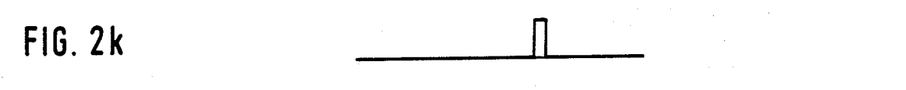

FIG. 2i shows the read-out data block, with the erroneous data word again designated by a vertical broken line. When the count content of the counter 13 reaches the value stored in the register 9, the comparator 18 produces the signal shown in FIG. 2k which is provided to the error correction circuit 15, which produces an exclusive-OR correlation of the error pattern provided at the output of the register 10, on the one hand, and the data word read out of the FIFO storage unit 5 at this same time, on the other hand. This produces the desired correction of the erroneous data word.

In the explanation of the error recognition circuit according to FIG. 3, it is assumed that the rules or performing the operations described by the Reed-Solomon code used in accordance with the D1 standard are well known (see the above named publication Tech 3252, pages 50, 51 and Annex 3).

The apparatus illustrated in FIG. 3 merely shows a particularly favorable equipment for deriving the correction signals. What is referred to here as a correction signal is the aggregate of the signals respectively specifying the error and the position of the erroneous data word within a block, although the position signal may be called a "correction control signal".

At the same time that the data words of a block are written into the FIFO storage unit 5 of FIG. 1, these data words are also applied, in parallel, to an input 30 of the error recognition circuit of FIG. 3, from which they go in parallel to the syndrome forming units 31 to 34. In the syndrome forming unit 31 a syndrome S0 is produced by accumulating together the data words and check words. In the syndrome forming units 32, 33 and 34 the syndromes S1, S2 and S3 are respectively formed by addition and multiplication by coefficient alpha, alpha$^2$ and alpha$^3$. The syndrome forming units 31-34 are clocked with a clock pulse C1, the origin of which is shown in FIG. 1. At the end of each code block the syndromes S0 to S3 are available at the respective outputs of the syndrome forming units 31 to 34. If all syndromes are equal to 0, that signifies that there is no error present.

As shown in FIG. 3, however, the syndromes S1 to S3, unlike the syndrome S0 are further processed by the circuits 36 to 38 respectively in what may be called a transcoding. This operation involves recalculation of the syndrome at the beginning of the code block by multiplication respectively by alpha$^{-63}$, alpha$^{-126}$ and alpha$^{-189}$. From the results of these calculations taken together with the syndrome 0, the location of the error is then shown by the syndrome-forming units 39 to 42. This takes place, in each such operation, in 64 clock periods of the clock pulses C1 which follow the end of the data block in question. When an erroneous data word appears, the syndromes S0', S1', S2' and S3' are equal to each other, so that a signal derived from the comparators 43, 44, 45 and the AND gate 46 has logic value 1 when the data word in question is erroneous. This signal is provided at the output 47 of the error recognition circuit and as described in connection with FIGS. 1 and 2, it is used for storing a designation of the position of the erroneous data word. At the same time, there is available the output 48 the syndrome S0' which corresponds to the error pattern of the erroneous data word which will produce a desired correction the exclusive-OR gate 17 of the error correction circuit 15 of FIG. 1.

Figure 4:
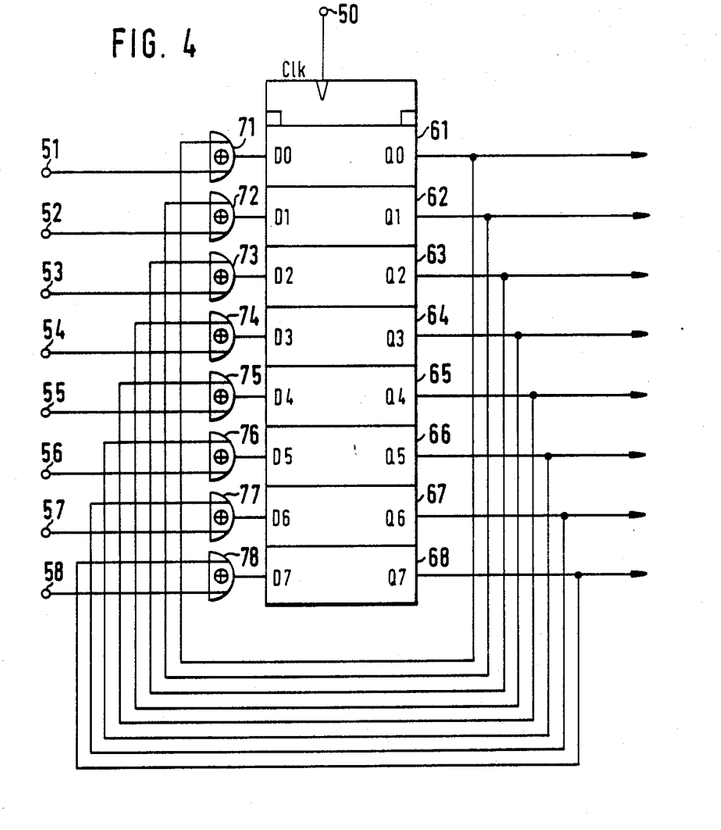
FIG. 4 is a block circuit diagram of a finite field addition circuit for Reed-Solomon codes in a (256) Galois field.

FIG. 4 shows an addition circuit for calculations of Reed-Solomon codes. The circuit shown in FIG. 4 can be simply produced by suitable programming of a commercially available programmable logic circuit. For each of the bits of a data word that are supplied at the respective inputs 51 to 58, one of the flipflop 61 to 68 is provided, the output signals of the flipflops 61 to 68 being fed back through exclusive-OR circuits 71 to 78 to the respective flip flop inputs. A clock signal is supplied to the clock input 50. With each pulse of the clock signal the input of each flipflop is supplied with an exclusive-OR correlation of the previous bit value with the new bit value at the input of the flipflop, an operation which has the same significance as an addition without carry.

Figure 5:
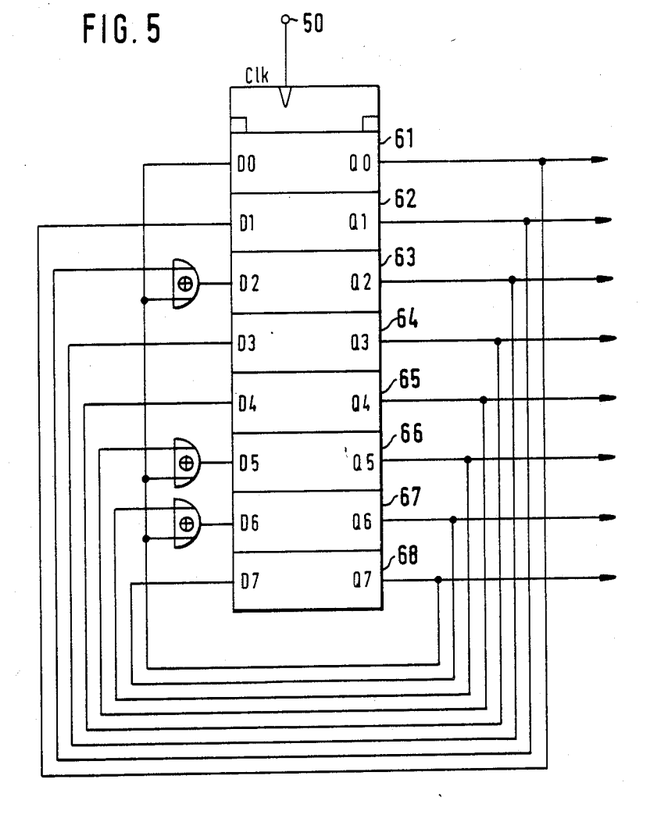
FIG. 5 is a block circuit diagram of a finite field multiplication circuit for alpha factors in a (256) Galois field.
Figure 6:
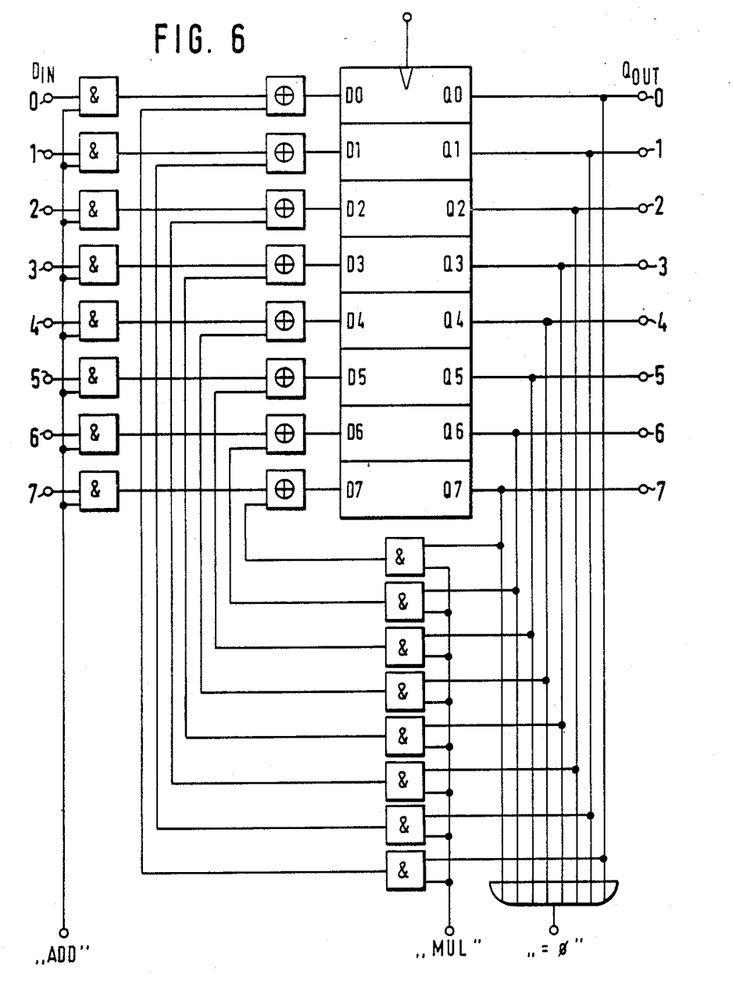
FIG. 6 is a block circuit diagram of syndrome forming circuits 31 and 39 of FIG. 3.
Figure 7:
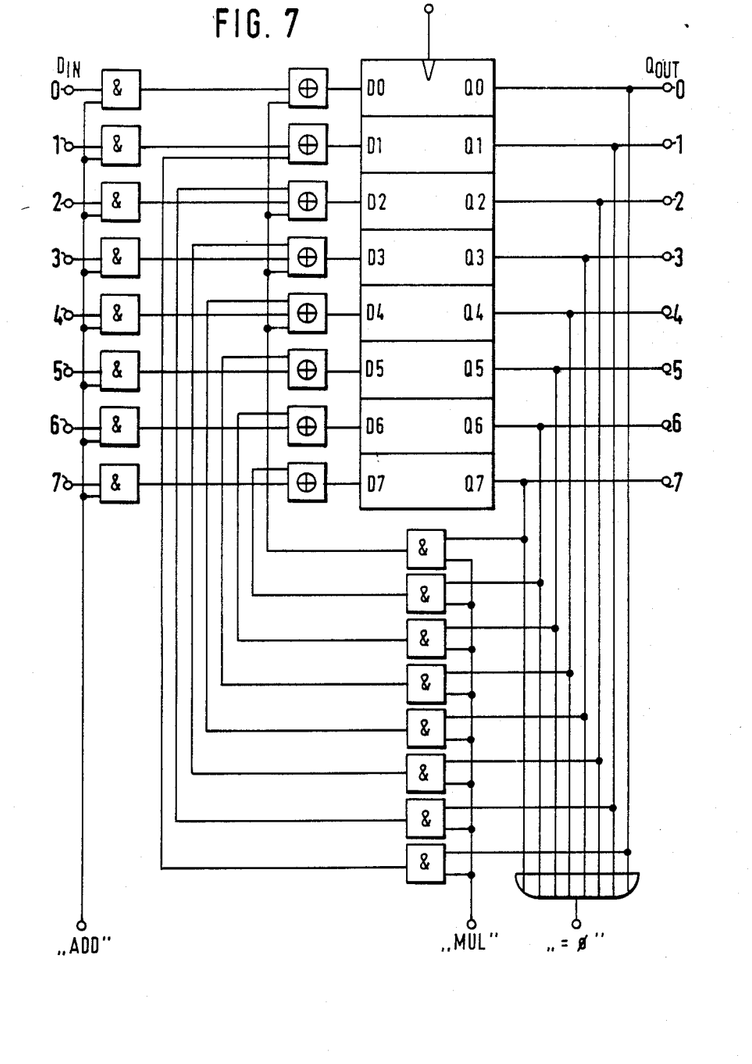
FIG. 7 is a block circuit diagram of syndrome forming circuits 32 and 40 of FIG. 3.
Figure 8:
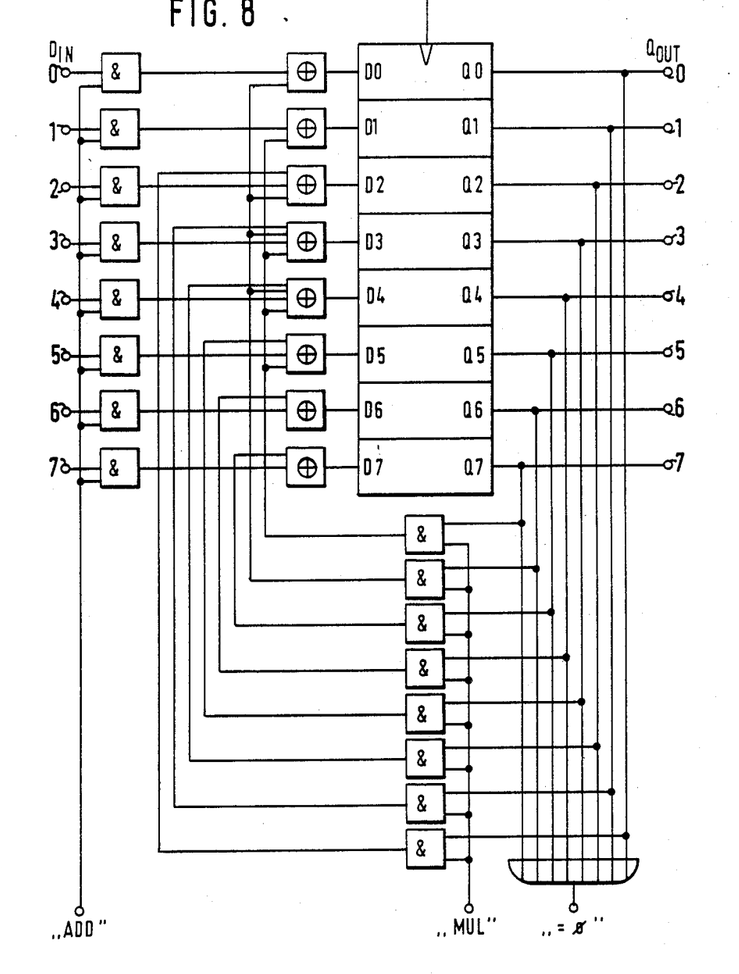
FIG. 8 is a block circuit diagram of syndrome forming circuits 33 and 41 of FIG. 3.
Figure 9:
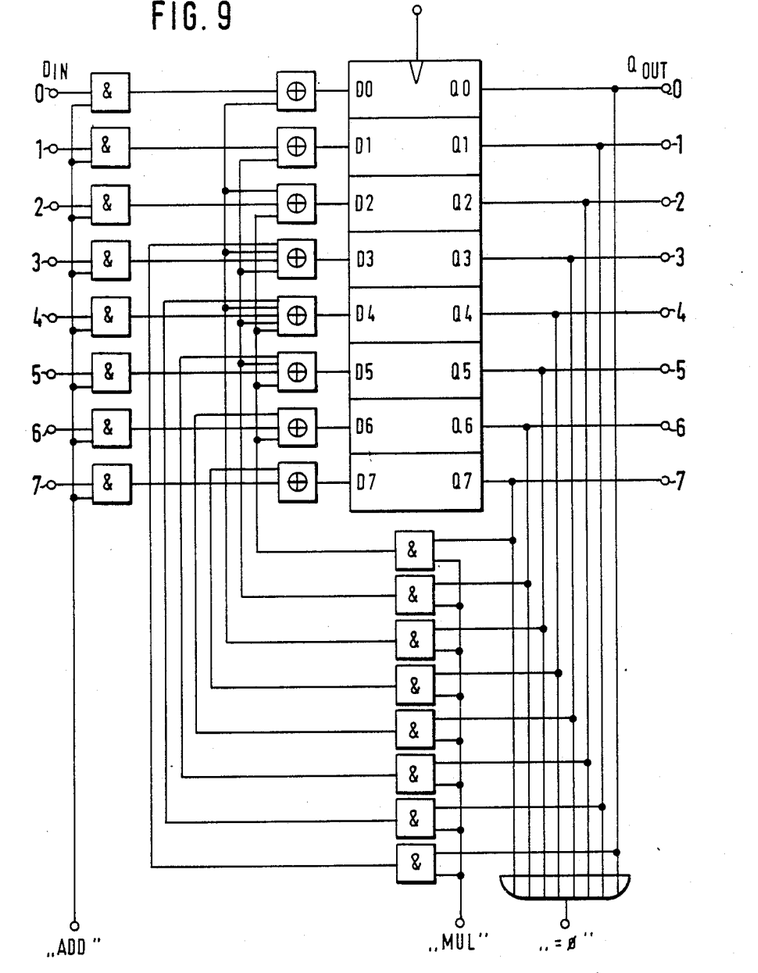
FIG. 9 is a block circuit diagram of syndrome forming circuits 34 and 42 of FIG. 3.

Multiplication with an alpha factor in a Reed-Solomon code is performed, for example, with a circuit such as shown in FIG. 5. When the multiplication function "MUL" with factor alpha is selected, the contents of the flipflops are shifted by one place in response to a clock pulse at the clock input 50; furthermore, the output signals of the flipflops 63, 65 and 66, before their supply to the input of the following flipflop (the next higher numbered flipflop), are correlated by an exclusive-OR unit with the output signal of the flipflop 68. In that manner, a multiplication by alpha in a finite Galois field (256) is performed for the field generating polynomial $x^8 + x^4 + x^3\, x^2 + 1$. Such a Galois field is commonly designated GF (256). By the use of programmable logic circuits, moreover, a circuit according to FIG. 4 can be provided by activation of a function "ADD", and a circuit according to FIG. 5 by activation of a function "MUL".

According to coding of the Reed-Solomon type and a known decoding (Chien-search) described in the technical literature, the programmable logic components 31 to 34 and 39 to 42, described with reference to FIGS. 6, 7, 8 and 9 in the next two paragraphs, are activated as follows to determine the error location.

The syndrome forming units 31 to 34 activate the function ADD and the function MUL during all 64 bytes of a code block except in the case of the first data word with which the register of the programmable logic component is first definitively loaded (i.e. interruption of the feedback) by ADD without multiplication. After the last byte of the code block, the syndromes are transformed in one clock period by the PROM tables 36 to 38 to the block beginning and are loaded into the error location registers 39 to 42. The programmable logic components 31 and 39, 32 and 40, 33 and 41 as well as 34 and 42 are pair-wise identical in their programming, as shown in FIGS. 6 to 9.

The loading of the transformed syndromes is made possible by activating the function ADD without MUL (no feedback). For the next 63 clock pulses, only the function MUL is activated and the input data of the component are ignored while the function ADD is switched off. The coding theory predicts that with this strategy, the location of the error is found when all the register contents are identical. If no equality appears in 64 clock pulses, there is an uncorrectable error.

Figure 10:
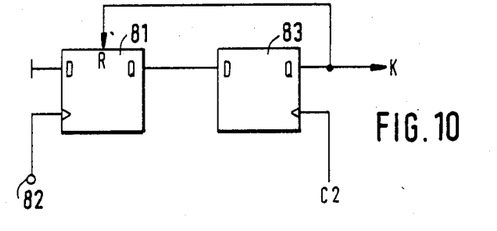
FIG. 10 is a block circuit diagram of the asynchronous coupling circuit 11 of FIG. 1.

FIG. 10 shows an embodiment of the circuit 11 of FIG. 1 for interlocking or correlating the clock pulses C2 with the overflow of the counter 8 and producing the pulse K shown in FIG. 2a. In FIG. 10 two D flipflops are used. A signal from the counter 8 FIG. 1 is supplied through the terminal 82 to the trigger input of the D flipflop 81. This signal designates the end of the write-in operation of the FIFO storage unit 5. When triggered, the D flipflop 81 changes its state and communicates this through its output Q to the input D of the flipflop 83 which will then change its state only at the time of the next impulse of the clock signal C2. The output Q of the flipflop 83 is connected with the reset input of the flipflop 81 so that the latter will be reset. By the thereby related change of the signal at the input D of the flipflop 83, the flipflop 83 is also reset at the next triggering by C2. In this way the circuit 11, after the appearance of a pulse at the terminal 82 produces a precisely defined signal during one period of the clock signal C2. This procedure is repeated with each pulse designating the end of write-in at the FIFO storage unit 5.

Figure 11:
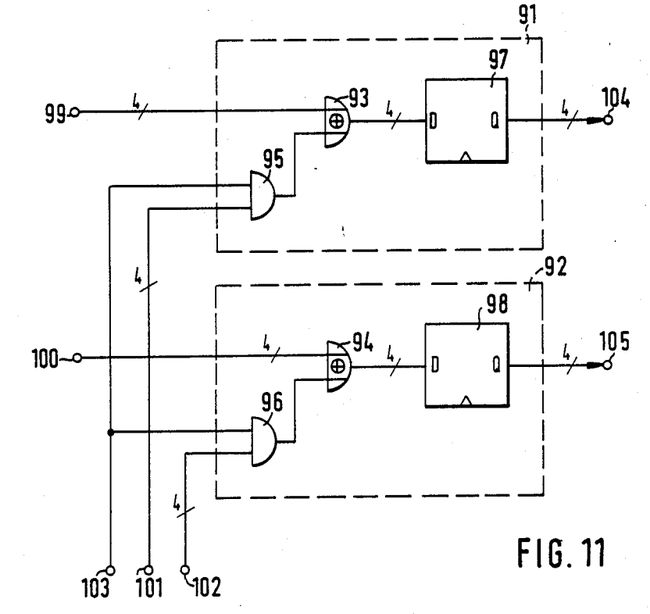
FIG. 11 is a block circuit diagram of an error correction circuit for use as the error correction circuit 15 of FIG. 1.

FIG. 11 shows an illustrative example of the error correction circuit 15 of FIG. 1. There are here provided two programmable logic circuits 91 and 92 each four bits wide and each having a quadruple exclusive-OR circuit, respectively 93 and 94, and respective AND circuits 95 and 96 and output registers respectively 97 and 98. Four binary places of the signals to be corrected are supplied in each case to the respective inputs 99 and 100 by the FIFO storage unit 5. The likewise 4-bits wide inputs 101 and 102 are presented with the correction signals that are intermediately stored in the register 10 of FIG. 1. The input 103 is connected to the output of the comparator 18 of FIG. 1. The corrected signals can be obtained from the outputs 104 and 105.

Although the invention has been described with respect to a particular illustrated embodiment, it will be understood that modifications and variations are possible within the inventive concept.

I claim:

1. Method of correcting errors in digital signals having a data word rate and having phase fluctuation of said rate such as those occurring in digital signals reproduced from a magnetic tape record, comprising the steps of:
    deriving a first data word rate signal from the digital signals;
    writing the digital signals into a first intermediate storage unit;
    generating, at said first data word rate, correction signals and related word identifying correction control signals for correctable erroneous data words among said digital signals;
    generating a second data word rate signal free of phase fluctuations and equal in frequency to said first data word rate signal;
    and reading said digital signals out of said first intermediate storage unit under control of said second data word rate signal at said second data word rate in the sequence in which they were written thereinto and, without disturbing the rate of readout, applying correction signals to correctable erroneous data words of said digital signals under control of said correction control signals and thereby correcting said erroneous data words.

2. Method according to claim 1, wherein said digital signals represent data blocks each preceded by a predetermined number of data words provided for synchronization and block identification, wherein the step of generating said correction signals and correction control signals takes place during and after the writing of said digital signals into said first intermediate storage unit and is followed by writing said correction and correction control signals into additional intermediate storage units for facilitating the application of said correction signals to correctable erroneous data words of said digital signals under control of said correction control signals without disturbing the readout of said digital signals from said first intermediate storage unit.

3. Method according to claim 2, wherein the step of generating said correction signals and related correction control signals includes the steps of:
    temporarily storing each data word of said digital signals in bit parallel form, forming a symbol-oriented error correction, and producing correction signal in the form of an error pattern signal and also a correction control signal in the form of an address corresponding to the position of a data word to be corrected within the data block which includes it.

4. Apparatus for correcting errors in digital signals having a data word rate and having phase fluctuations of said rate such as those occurring in digital signals reproduced from a magnetic tape record, said digital signals being in the form of data blocks including a plurality of check words in predetermined positions in said data block and each having the same number of data words and each preceded by synchronizing and block identification words, said apparatus comprising:
    means for separating said synchronizing signal words and for deriving therefrom and from said digital signals generally a first data word rate signal;
    first intermediate storage means for storing and reading out on a first-in and first-out basis the data words of said blocks, said first storage means including means for deriving write-in pulses therefor from pulses of said first data word rate signal and also including means for generating pulses of the same frequency as said first data word rate signal which are free of phase fluctuation and for obtaining therefrom readout signals for said first storage means;

means operating at said first data word rate, for generating correction signals with related word identifying correction control signals for correctable erroneous data words among said digital signals;

means for applying said correction signals to correctable erroneous data words of said data blocks under the control of said correction control signals without disturbing the rate of read-out from said first intermediate storage means, said correction signal applying means including additional storage means for storing said correction signals and correction control signals and a circuit for asynchronous coupling of said fluctuation-free pulses and pulses of said write-in signals of said first intermediate storage means in such a way that the end of the writing of a data block into said first means produces the beginning of a sequence of rate-fluctuation-free pulses for reading the data words of said data block out of said first intermediate storage means.

5. Apparatus according to claim 4, wherein said means for generating correction signals and correction control signals include first and second counters and said additional storage means includes first and second registers and a comparator, said first counter being connected for being advanced by pulses of said first data word rate signal and having a count state output connected to the loading input of said first register, said second counter being connected for being advanced by said fluctuation-free pulses and having a count state output connected to one input of said comparator, while a second input of said comparator is connected to said first register, said correction signal applying means being connected to the output of said first intermediate storage means and to said second register and having a control input connected to an output of said comparator.

6. Apparatus according to claim 5, wherein said first and second registers are multiple registers having at least two 8-bit register portions.

7. Apparatus according to claim 4, wherein said means for generating correction signals and correction control signals are connected for receiving data word signals in parallel at the same time as said word signals are written into said first intermediate storage means and include a plurality of syndrome forming units of a first set of syndrome forming units for forming syndrome signals according to various predetermined algorithms, coefficient multiplying circuits connected to the respective outputs of all except a first one of said first set of syndrome forming units, a plurality of syndrome units of a second set, one of which is connected to said first one of said syndrome forming units of said first set which has no multiplying circuit connected to its output, the remainder of said syndrome forming units of said second set having inputs connected respectively to the outputs of said multiplying circuits and a set of equivalence circuits respectively connected to the outputs of said syndrome forming units of said second set.

8. Apparatus according to claim 7, wherein said syndrome forming units of said first and second sets of said multiplying circuits are composed of programmable array logic (PAL) circuits.

9. Apparatus according to claim 8, wherein at least one group of said programmable array logic circuits are so programmed that they perform additions or multiplications in a finite field, with selection of addition or multiplication being performed in response to control signals.

10. Apparatus according to claim 4, wherein said first intermediate storage unit is equipped for storing identification data words preceding each data block along with the data block which they precede.

* * * * *